(12) United States Patent
Caico

(10) Patent No.: US 9,565,830 B1
(45) Date of Patent: Feb. 14, 2017

(54) VENTILATED LITTER BOX

(71) Applicant: James Caico, Ocala, FL (US)

(72) Inventor: James Caico, Ocala, FL (US)

( * ) Notice: Subject to any disclaimer, the term of this patent is extended or adjusted under 35 U.S.C. 154(b) by 73 days.

(21) Appl. No.: 14/631,270

(22) Filed: Feb. 25, 2015

Related U.S. Application Data

(60) Provisional application No. 62/017,545, filed on Jun. 26, 2014.

(51) Int. Cl.
| | | |
|---|---|---|
| *A01K 29/00* | (2006.01) |
| *A01K 1/01* | (2006.01) |
| *A01K 1/00* | (2006.01) |
| *B01D 46/00* | (2006.01) |
| *F24F 7/007* | (2006.01) |

(52) U.S. Cl.
CPC ........... *A01K 1/0114* (2013.01); *A01K 1/0047* (2013.01); *A01K 1/0107* (2013.01); *B01D 46/0038* (2013.01); *F24F 7/007* (2013.01)

(58) Field of Classification Search
CPC ... A01K 1/0047; A01K 1/0058; A01K 1/0107
USPC .................................. 119/165, 500, 161–163
See application file for complete search history.

(56) References Cited

U.S. PATENT DOCUMENTS

| | | | |
|---|---|---|---|
| 4,095,559 A | 6/1978 | Griffith | |
| 5,511,513 A * | 4/1996 | Baron | A01K 1/0107 119/163 |
| 5,564,364 A * | 10/1996 | Kovacs | A01K 1/0107 119/163 |
| 5,655,478 A * | 8/1997 | Kiera | A01K 1/0047 119/165 |
| 5,755,181 A * | 5/1998 | Petkovski | A01K 1/0107 119/163 |
| 5,778,822 A * | 7/1998 | Giffin | A01K 1/0047 119/165 |
| 5,988,108 A | 11/1999 | Silver | |
| 5,996,533 A | 12/1999 | Gordon | |
| 6,341,579 B1 * | 1/2002 | Alkire | A01K 1/0107 119/165 |
| 6,701,868 B1 * | 3/2004 | Shepherd | A01K 1/0114 119/161 |
| D612,554 S | 3/2010 | Seager et al. | |
| 8,297,230 B2 | 10/2012 | Ferrer et al. | |

(Continued)

FOREIGN PATENT DOCUMENTS

CA    2189171 A1 *  4/1998  ........... A01K 1/0107

*Primary Examiner* — Danielle Clerkley
(74) *Attorney, Agent, or Firm* — Robert C. Montgomery; Montgomery Patent & Design LLC

(57) ABSTRACT

A battery-powered ventilated litter box having a litter box assembly with a litter tray and a removable lid enclosure with a door opening that provides pet access to an inner space. A fan assembly includes a housing that is attached to the lid enclosure and which forms an air conduit through the lid enclosure. The housing has an air exhaust and an air intake and a fan assembly having a fan that draws air from the inner space into the air intake. A filter element is disposed within the fan assembly. The fan expels air from the air exhaust. The litter box assembly includes louvers, preferably on the sides of the litter box assembly and a downwardly extending lower rim that mates with the litter box. The fan includes a fan motor having a vertically orientated shaft. The filter element is preferably a HEPA filter.

15 Claims, 4 Drawing Sheets

(56) References Cited

U.S. PATENT DOCUMENTS

| | | | | |
|---|---|---|---|---|
| 8,881,680 B1* | 11/2014 | Woody | ............... | A01K 1/0114 119/165 |
| 2006/0156993 A1 | 7/2006 | Wright | | |
| 2006/0201437 A1* | 9/2006 | Ryan | ................ | A01K 1/0107 119/165 |
| 2009/0272327 A1* | 11/2009 | Plante | ............... | A01K 1/0107 119/168 |
| 2010/0319627 A1* | 12/2010 | Cauchy | ............. | A01K 1/0236 119/500 |
| 2011/0297096 A1* | 12/2011 | Northrop | ........... | A01K 1/0107 119/165 |
| 2012/0137980 A1* | 6/2012 | Veness | .............. | A01K 1/0107 119/165 |
| 2014/0141708 A1* | 5/2014 | Baker | ................ | F04D 19/002 454/249 |

\* cited by examiner

VENTILATED LITTER BOX

RELATED APPLICATIONS

This application claims the benefit of U.S. Provisional Application No. 62/017,545, which was filed Jun. 26, 2014, the entire disclosures of which are incorporated herein by reference.

FIELD OF THE INVENTION

The presently disclosed subject matter is directed to pet care products. More particularly, it is directed to a ventilated litter box that dispenses filtered and deodorized air from the litter box.

BACKGROUND OF THE INVENTION

Keeping pets is a seemingly never-ending task. One (1) must feed, groom, exercise, play with and clean-up after their animal friends. For those that raise, breed or board cats one (1) of their more unpleasant responsibilities includes maintaining litter boxes. While litter boxes have proven themselves to be highly valuable, even the best and most diligently maintained litter box can still produce objectionable odors.

Problems with litter boxes become exaggerated when the cat owner is gone for long periods of time such as working or traveling. Even if the litter box is immediately cleaned or changed objectionable odors can remain in the air. Such odors can linger for hours, much to the dismay of cat owner, other residents, or guests.

Accordingly, there exists a need for some device that controls and reduces odors emanating from litter boxes. Preferably such a device would be quick and easy to use to use and be effective at eliminating objectionable odors.

SUMMARY OF THE INVENTION

The principles of the present invention provide for litter boxes that control and reduce odors. The inventive litter boxes are quick and easy to use and effective at eliminating objectionable odors.

A ventilated litter box in accord with the present invention includes a litter box assembly having a litter tray and a removable lid enclosure. The lid enclosure includes a door opening which provides pet access to an inner space. Also included is a fan assembly that forms an air conduit through the lid enclosure. The fan assembly includes a housing that is attached to the lid enclosure. The housing has an air exhaust and an air intake. The fan assembly further includes a fan for drawing air from the inner space into the air intake. The fan further for expelling air from the air exhaust. A filter element is within the fan assembly. The filter element is for filtering odors from air expelled from the air exhaust.

Beneficially the litter box assembly includes louvers, preferably on the sides of the litter box assembly. The lid enclosure may also include a downwardly extending lower rim that mates with the litter box. The fan includes a fan motor, preferably with a vertically-orientated shaft. In practice the fan assembly includes an air exhaust grill at the air exhaust and an air intake grill at the air intake. A filter cover is then disposed below the air intake grill. The filter cover may be hinged at one (1) side to the housing and may have a latch at an opposed side to latch the filter cover closed on said housing. The filter element is then disposed between the filter cover and the air intake grill. In practice the filter element may be a HEPA filter.

The ventilated litter box may also include a compartment attached to the lid enclosure which holds a power source for providing electrical power to the fan assembly. That power source may include at least one (1) rechargeable battery and the compartment can be considered a battery compartment having a battery aperture containing the at least one (1) rechargeable battery. There may be a charge lamp operatively connected to the at least one (1) rechargeable battery and which illuminates when the at least one (1) rechargeable battery needs recharging. The ventilated litter box can further include a charger for recharging the at least one (1) rechargeable battery. In addition there may be a second rechargeable battery for powering the fan assembly when the at least one (1) rechargeable battery is being recharged. The ventilated litter box may include a circuit board in electrical communication with the at least one (1) battery, the power switch, and the charge lamp via interconnecting wiring. In that case the circuit board monitors electrical current from the at least one (1) battery or other power source.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
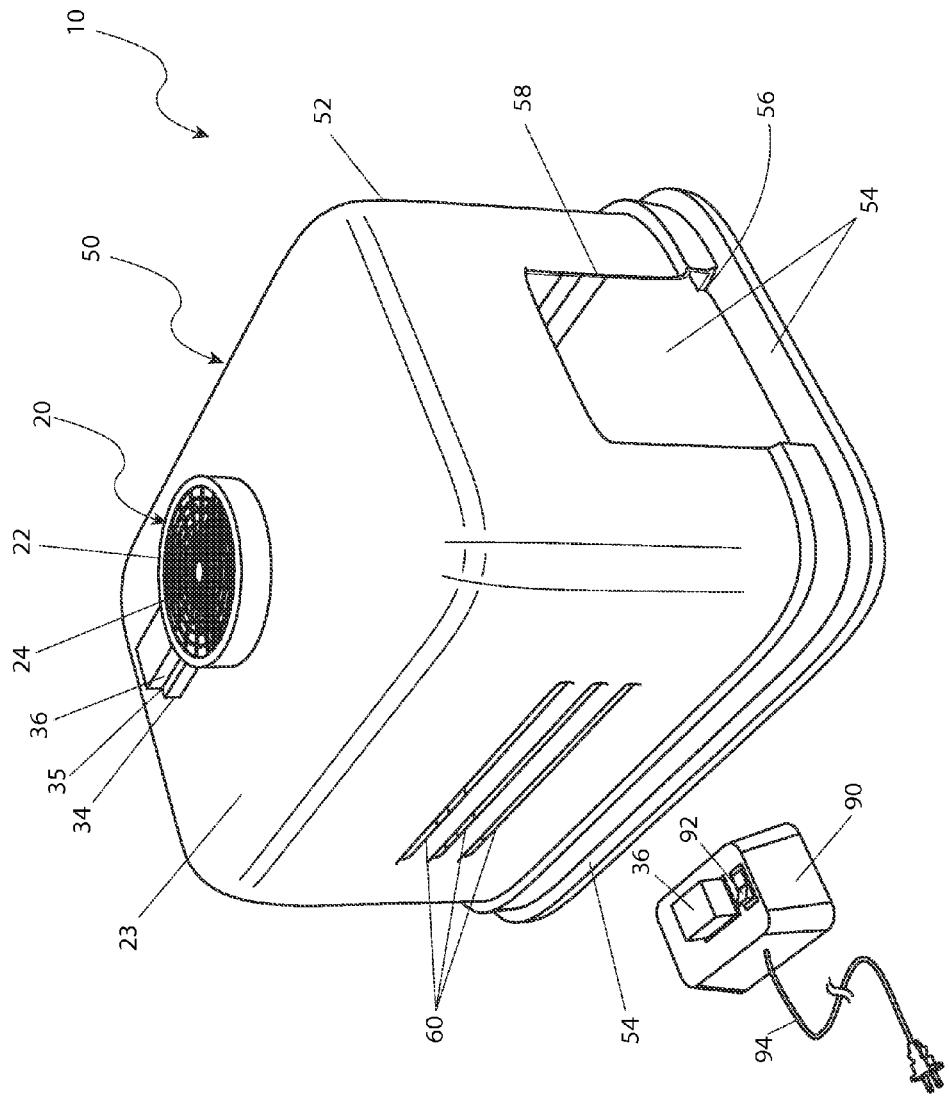
FIG. 1 is a perspective view of a ventilated litter box 10 according to a preferred embodiment of the present invention.

DESCRIPTIVE KEY 10 ventilated litter box
20 fan assembly
22 fan housing
23 top panel
24 air exhaust grill
26 motor
28 propeller
30 propeller shaft
32 fan bracket
34 battery compartment
35 battery aperture
36 battery
38 power switch
40 charge lamp
42 circuit board
43 connector
50 litter box assembly
52 lid enclosure
54 litter tray
56 rim
58 door opening
60 louver
62 inner space
70 filter cover
71 filter element 72 hinge
74 latch
76 air intake grill
80 fastener
82 interconnecting wiring
90 battery charger
92 charger switch
94 power cord
100 inlet air
102 exhaust air

DETAILED DESCRIPTION OF THE PREFERRED EMBODIMENT

The preferred embodiment of the present invention is depicted within FIGS. 1 through 4. However, the invention is not limited to what is specifically illustrated and described. A person skilled in the art will appreciate that many other embodiments of the invention are possible without deviating from the basic concept of the invention. Any such work around also falls with the scope of this invention.

The terms "a" and "an" herein do not denote a limitation of quantity, but rather denote the presence of at least one (1) of the referenced items. In addition, unless otherwise denoted all directional signals such as up, down, left, right, inside, outside are taken relative to the illustration shown in FIG. 1.

Figure 2:
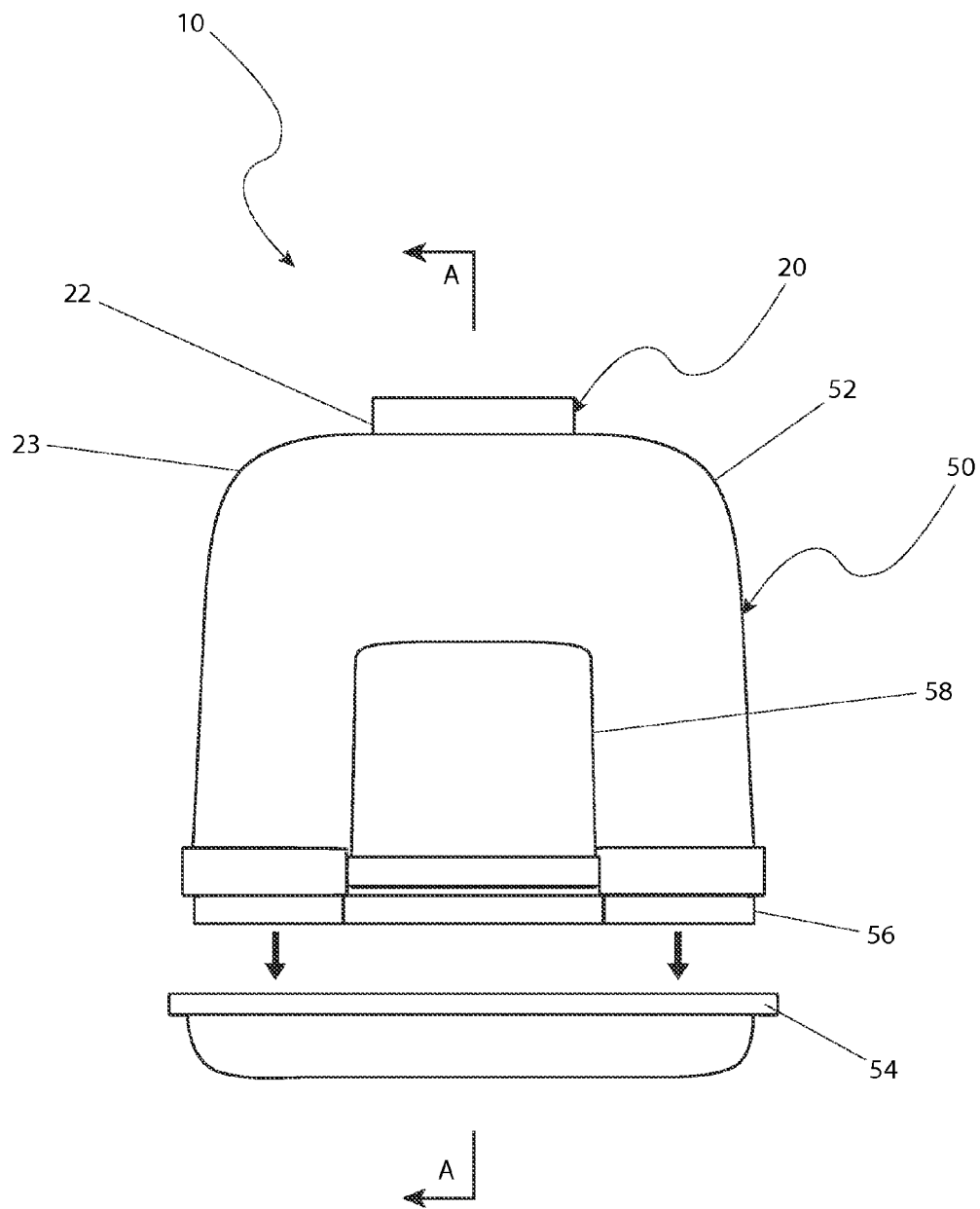
FIG. 2 is a front view of the ventilated litter box 10 shown in FIG. 1.

Referring now to FIGS. 1 and 2, the present invention describes a ventilated litter box 10 having a domed litter box assembly 50. The ventilated litter box 10 also includes an integral fan assembly 20 that forms an air conduit though the litter box assembly 50. The fan assembly 20 includes an internal filter element 71 (see FIG. 3) that helps eliminate airborne particulate and odors as air passes though the fan assembly 20. The fan assembly 20 is beneficially located on the top panel 23 of a lid enclosure 52 portion of the litter box assembly 50. The litter box assembly 50 also includes a litter tray 54.

Figure 3:
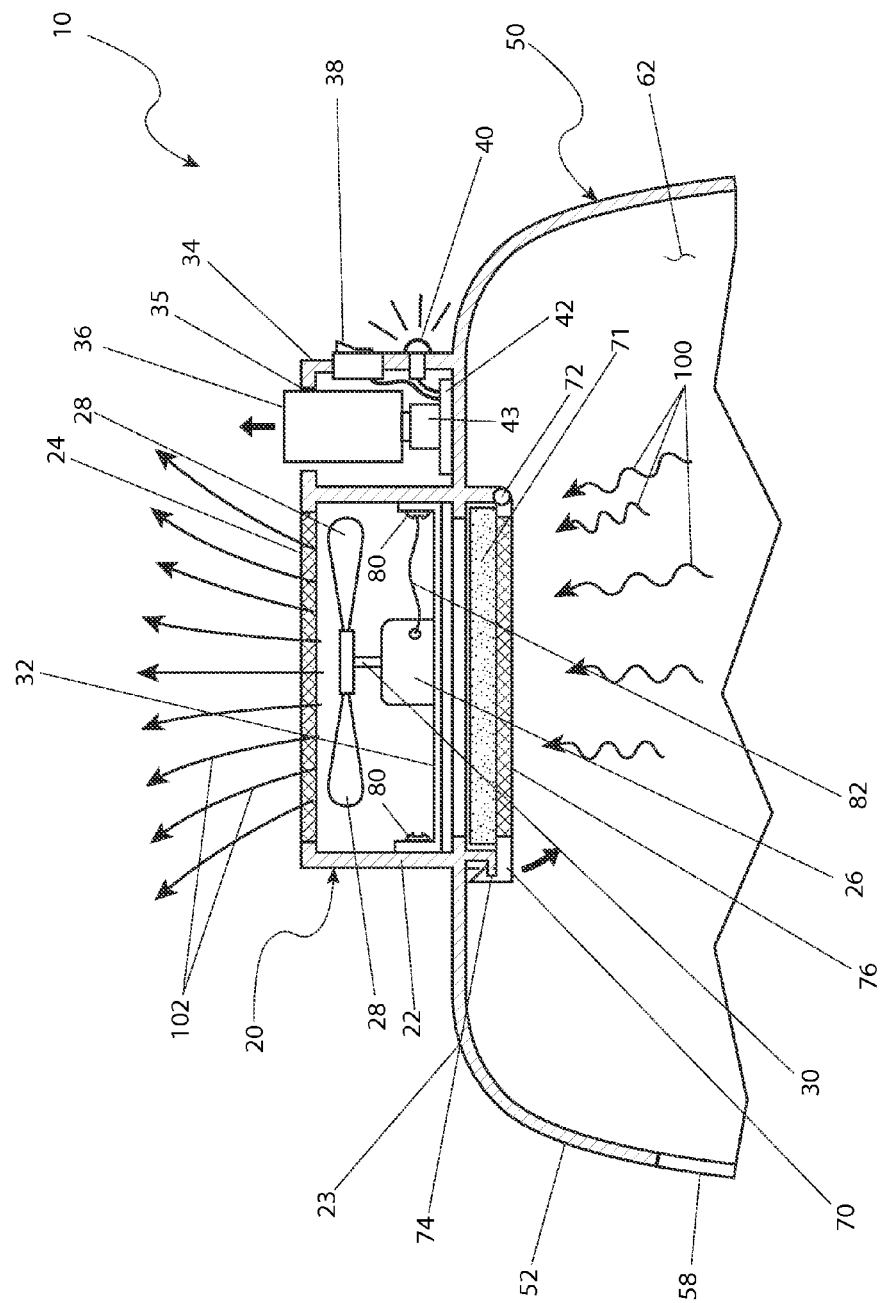
FIG. 3 is a sectional view of the ventilated litter box 10 taken along section line A-A of FIG. 2; and, FIG. 4 is an electrical block diagram of the ventilated litter box 10 shown in FIGS. 1 and 2.

Referring now to FIGS. 1 and 3, the fan assembly 20 includes a cylindrical fan housing 22 and a battery compartment 34 that are both preferably integrally-molded with the top panel 23. However, it should be understood that the fan assembly 20 and/or battery compartment 34 may be otherwise affixed to a litter box assembly 50. Such is particularly useful when retrofitting a fan assembly 20 onto an existing litter box. The fan housing 22 has a top protective air exhaust grill 24. At the bottom of the fan assembly 20 is an air intake grill 76 which retains the filter element 71.

The battery compartment 34 includes a battery aperture 35 which receives one or more rechargeable batteries 36 in such a manner as to provide fast battery 36 replacement. A battery 36 is envisioned as being a "plug-in" type battery similar to those used on power tools. In practice a pair of batteries 36 is beneficial as such enables recharging one battery 36 while operating the fan assembly 20 with the other. In an event the battery 36 is recharged by a battery charger 90 (also see FIG. 4). The battery charger 90 includes normal and expected features including a charger switch 92 and a standard 110-volt power cord 94 (again, also shown in FIG. 4).

Turning back to FIGS. 1 and 2, the litter box assembly 50 incorporates a two-part detachable construction that includes the lid enclosure 52, which has a door opening 58, and the litter tray 54. The litter box assembly 50 has a generally rectangular-shaped footprint and a plurality of louvers 60 that are disposed along the sides of the litter box assembly 50. The louvers 60 facilitate entry of inlet air 100. The litter box assembly 50 also includes a downwardly extending rim 56 along its bottom perimeter edge. The rim 56 slides into the litter tray 54.

The litter tray 54 is configured to rest on the floor. The litter tray 54 has sufficient size and depth to contain a volume of pet litter sufficient to absorb all or almost all urine and odors and to clump fecal matter. The litter box assembly 50 also provides a sufficient inner space 62 to facilitate use by a pet such as a cat. It should be understood that the litter box assembly 50 may be introduced with various sizes, shapes, colors, and the like.

Turning now primarily to FIGS. 1 and 3, ventilation and filtration is provided within the ventilated litter box 10 by inlet air 100 which is drawn in through the louvers 60 and across the litter tray 54 by the fan assembly 20. The inlet air 100 is subsequently drawn up through the filter element 71 and out as exhaust air 102 which is propelled from the lid enclosure 52 by the fan assembly 20. Since room air forms the inlet air 100 and thus passes through the filter element 71 and fan assembly 20, the ventilated litter box 10 also helps remove other odors such as smoke, food odors, and the like from the room.

While FIGS. 1-3 show the fan assembly 20 as being centered along the top panel 23 of the litter box assembly 50, while beneficial such is not required. The fan assembly 20 might be located differently, such as on a side wall of the lid enclosure 52. The fan assembly 20 includes the air exhaust grill 24 (FIG. 1), an electric motor 26, a propeller 28, a propeller shaft 30, and a horizontal fan bracket 32 (shown in FIG. 3). The motor 26, propeller 28, and propeller shaft 30 are vertically assembled and orientated to draw inlet air 100 into the litter box assembly 50 and out as exhaust air 102. The motor 26 is supported by the fan bracket 32 which is in turn is affixed to opposing inner surfaces of the fan housing 22 using fasteners 80 such as screws, rivets, or the like.

The propeller 28 has a plurality of densely arranged turbine-type fan blades that provide an air flow of approximately one cubic foot per minute (1 cfm) while rotating at a slow and silent speed so as to not alarm the pet.

Figure 4:
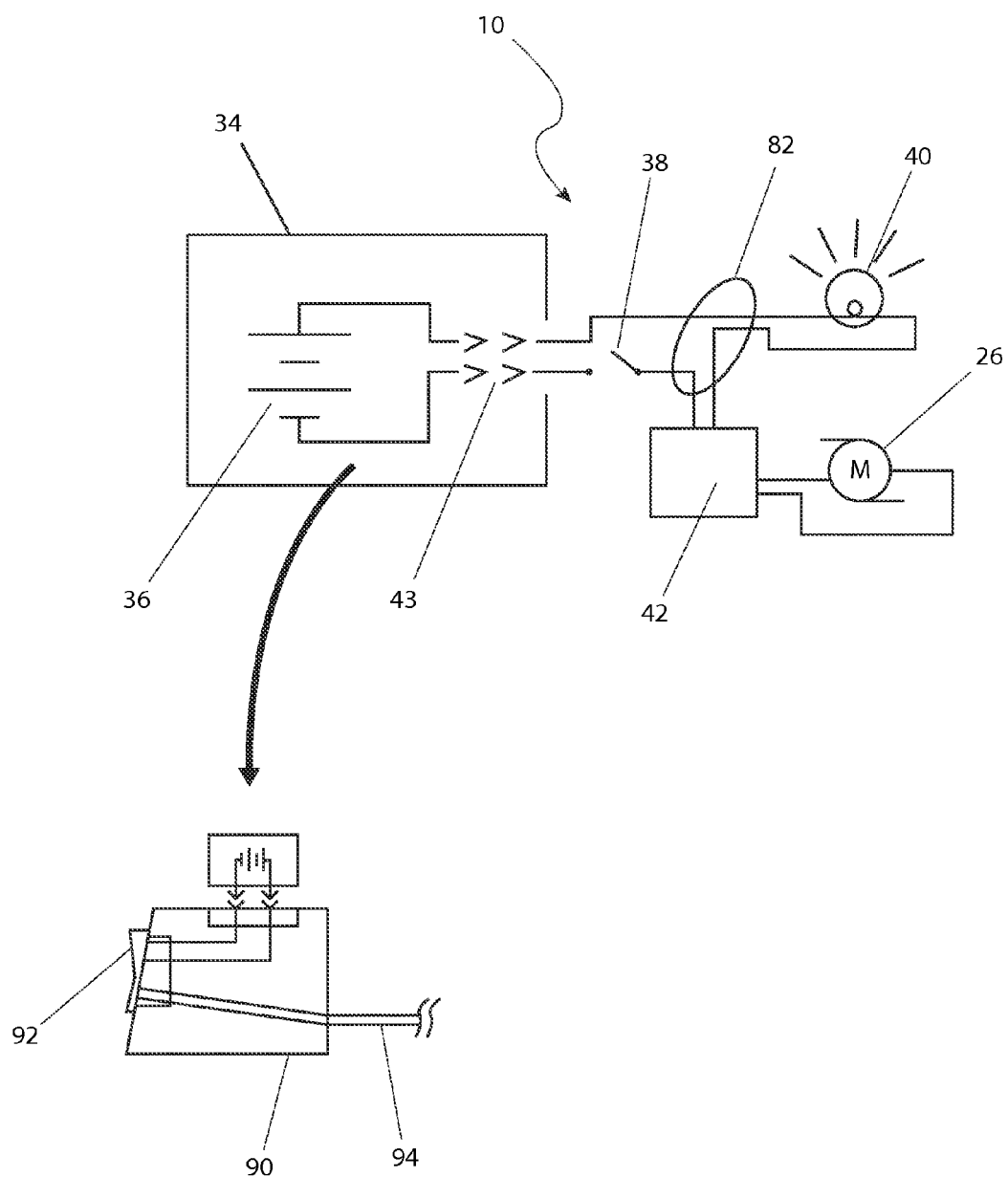

Referring now to FIGS. 3 and 4, the battery compartment 34 provides power to the fan assembly 20. The battery compartment 34 includes the battery aperture 35 which provides easy access to the "plug-in-type" battery 36. The battery compartment 34 also includes a power switch 38, a charge lamp 40 that is used to indicate a "low battery" condition, and a circuit board 42 having an integral battery connector 43 which provides an electrical connect to the battery 36. The circuit board 42 is anchored to the bottom of the battery compartment 34, preferably using fasteners 80 or the like. The circuit board 42 is in electrical and electronic communication with the motor 26, the power switch 38, and the charge lamp 40 via interconnecting wiring 82.

Referring now to FIG. 3, the filter element 71 is envisioned as having either a circular or rectangular shape. The filter element 71 is retained within a correspondingly circular or rectangular plastic filter cover 70 which encompasses the outside edges of the filter element 71. The filter cover 70 includes the integral air intake grill 76 which covers the bottom of the filter cover 70. The filter cover 70 provides easy access and replacement of the filter element 71 via a hinge 72 and a hook-type latch 74 that are disposed on opposing edges. Opening the latch 74 enables the filter cover 70 to be pivot downward on the hinge 72 for periodic removal and replacement of the filter element 71.

Ventilation and filtration using the ventilated litter box 10 take place as inlet air 100 is drawn in through the louvers 60 and across the litter tray 54 via suction created by the fan assembly 20. The inlet air 100 is drawn through the filter element 71 and the resultant exhaust air 102 is propelled from the fan assembly 20 through the aforementioned air exhaust grill 24. The filter element 71 is intended to provide effective filtration of both particulate matter and odors and is envisioned to be a HEPA filter unit having a supplemental layer of activated charcoal. Alternatively it might be impregnated with activated charcoal for the absorption of the odors emanating from the litter tray 54. The filter element 71 would be removed, discarded, and replaced on a periodic basis to ensure optimum filtration performance (see FIG. 3).

FIG. 4 presents an electrical block diagram of the ventilated litter box 10. The fan assembly is powered by one of the batteries 36, which is preferably a twelve volts (12 V) battery. The battery 36 is installed in the connector 43 of a circuit board 42 by being inserted through the battery aperture 35 shown in FIG. 3. The battery 36 and the fan assembly 20 are beneficially designed to provide at least twelve hours (12 hr) of continuous operation with a fully charged battery 36. The circuit board 42 is in electrical and electronic communication with the motor 26, the power switch 38, and the charge lamp 40 via the interconnecting wiring 82.

The circuit board 42 includes microprocessor-based electronics and relay switching capability to control current to the motor 26 based upon a position of the power switch 38. The circuit board 42 is also capable of monitoring electrical current from the battery 36 and activating the charge lamp 40 as needed. Thus the charge lamp 40 comes on when the battery 36 should be replaced by a fully recharged battery 36.

As noted the ventilated litter box 10 may use two (2) batteries 36. The second battery 36 would then receive a charge from the charger 90 while the other battery 36 is in use. This supports continuous use of the fan assembly 20 by swapping out one (1) battery 36 for charging while being operated by the second battery 36 in a cyclical manner.

It is envisioned that other styles and configurations of the present invention can be easily incorporated into the teachings of the present invention. While only one particular configuration is shown and described that is for purposes of clarity and not by way of limitation of scope.

The preferred embodiment of the present invention can be used by the common user in a simple and effortless manner with little or no training. After initial purchase or acquisition of the ventilated litter box 10 it would be installed as indicated in FIGS. 1 through 3.

Using the ventilated litter box 10 may be performed by: procuring a model of the ventilated litter box 10 having a desired size and appearance; installing a new filter element 71 by removing the lid enclosure 52 from the litter tray 54; flipping over the lid enclosure 52 to access the filter cover 70; releasing the latch 74 and pivoting the filter cover 70 downward; removing a previously used filter element 71, if present; placing a new filter element 71 upon the air intake grill 76; pivoting the filter cover 70 upward until the latch 74 "snaps" closed; placing a desired quantity of litter into the litter tray 54; replacing the lid enclosure 52 onto the litter tray 54 by engaging the rim 56 of the lid enclosure 52 into the litter tray 54; providing a fresh charge to the battery 36 using the battery charger 90; inserting the charged battery 36 downward through the battery aperture 35 of the battery compartment 34 until the battery 36 is securely plugged into the connector 43 within the battery compartment 34; placing a second battery 36 into the battery charger 90 for charging and subsequent use; activating the fan assembly 20 by pressing the power switch 38; allowing the fan assembly 20 to draw inlet air 100 through the louvers 60 and across the litter tray 54; allowing the fan assembly 20 to draw the inlet air 100 through the filter element 71 to remove particulate matter and absorb odors emitted from the litter tray 54; allowing the fan assembly 20 to propel the resultant filtered exhaust air 102 out through the air exhaust grill 24; replacing the filter element 71 periodically as needed; and, benefiting from a reduced presence of airborne particulate and odors from the pet litter within a user's domicile, afforded a user of the ventilated litter box 10.

Since ambient room air, in addition to the contaminated air within the litter box assembly 50, also passes through the filter element 71 and fan assembly 20, the ventilated litter box 10 also helps remove other odors from the living area such as smoke, food odors, and the like.

Continuous operation of the ventilated litter box 10 may be obtained by using both batteries 36 in an alternating manner. The second battery 36 would receive a charge using the battery charger 90 while the other battery 36 is powering the fan assembly 20. To further enable uninterrupted operation of the ventilated litter box 10 the circuit board 42 monitors the battery 36 operating the fan assembly 20 and illuminates the charge lamp 40 when the battery 36 needs to be charged or swapped out.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A ventilated litter box, comprising:
   a litter box assembly having a litter tray, louvers, and a removable lid enclosure, said lid enclosure including a door opening which provides pet access to an inner space;
   a fan assembly that forms an air conduit through said lid enclosure, said fan assembly including a housing attached to said lid enclosure, said housing having an air exhaust with an air exhaust grill and an air intake with an air intake grill, said fan assembly further including a fan for drawing air from said inner space into said air intake, a fan motor with a vertically oriented shaft, a filter cover disposed below said air intake grill and hinged at one side to said housing and having a latch at an opposed side to latch said filter cover closed on said housing, said fan further for expelling air from said air exhaust; and,
   a filter element within said fan assembly for filtering odors from air expelled from said air exhaust.

2. The ventilated litter box of claim 1, wherein said louvers are located on sides of said litter box assembly.

3. The ventilated litter box of claim 1, wherein said lid enclosure includes a downwardly extending lower rim that mates with said litter tray.

4. The ventilated litter box of claim 1, wherein said filter element is disposed between said filter cover and said air intake grill.

5. The ventilated litter box of claim 4, wherein said filter element is a HEPA filter.

6. The ventilated litter box of claim 1, further including a compartment attached to said lid enclosure and having a power source for providing electrical power to said fan assembly.

7. The ventilated litter box of claim 6, wherein said power source includes at least one rechargeable battery, and wherein said compartment is a battery compartment having a battery aperture containing at least one rechargeable battery.

8. The ventilated litter box of claim 7, further including a charge lamp operatively connected to said at least one rechargeable battery, wherein said charge lamp illuminates when said at least one rechargeable battery needs recharging.

9. The ventilated litter box of claim 7, further including a charger for recharging said at least one rechargeable battery.

10. The ventilated litter box of claim 7, further including at least a second rechargeable battery for powering said fan assembly when said at least one rechargeable battery is being recharged.

11. The ventilated litter box of claim 8, further including a circuit board in electrical communication with said at least one battery, a power switch, and said charge lamp via interconnecting wiring, and wherein said charge lamp is caused to illuminate when said at least one rechargeable battery need recharging.

12. The ventilated litter box of claim 11, wherein said circuit board monitors electrical current from said at least one battery.

13. The ventilated litter box of claim 6, wherein said compartment includes a user accessible power switch for selectively enabling electrical power to flow from said power source.

14. The ventilated litter box of claim 13, further including a circuit board in electrical communication with said power source and said power switch via interconnecting wiring.

15. The ventilated litter box of claim 14, wherein said circuit board monitors electrical current from said power source.

* * * * *